US008205053B2

(12) United States Patent
Bekooij

(10) Patent No.: US 8,205,053 B2
(45) Date of Patent: Jun. 19, 2012

(54) METHOD AND SYSTEM FOR ACCESSING MEMORY USING AN AUXILIARY MEMORY

(75) Inventor: Marco Jan Bekooij, 's Hertogenbosch (NL)

(73) Assignee: NXP B.V., Eindhoven (NL)

( * ) Notice: Subject to any disclaimer, the term of this patent is extended or adjusted under 35 U.S.C. 154(b) by 749 days.

(21) Appl. No.: 12/063,908

(22) PCT Filed: Aug. 11, 2006

(86) PCT No.: PCT/IB2006/052777
§ 371 (c)(1),
(2), (4) Date: Dec. 2, 2008

(87) PCT Pub. No.: WO2007/020577
PCT Pub. Date: Feb. 22, 2007

(65) Prior Publication Data
US 2009/0216983 A1    Aug. 27, 2009

(30) Foreign Application Priority Data
Aug. 16, 2005 (EP) .................................. 05107511

(51) Int. Cl.
*G06F 13/00* (2006.01)
*G06F 13/28* (2006.01)
(52) U.S. Cl. .............. 711/165; 711/154; 711/E12.002
(58) Field of Classification Search .............. None
See application file for complete search history.

(56) References Cited

U.S. PATENT DOCUMENTS

| 6,643,726 | B1 * | 11/2003 | Patkar et al. ............ 710/306 |
| 7,779,236 | B1 * | 8/2010 | Isaman ............ 712/216 |
| 2002/0188804 | A1 * | 12/2002 | Rakvic et al. ............ 711/118 |
| 2004/0078790 | A1 | 4/2004 | Wu et al. |

FOREIGN PATENT DOCUMENTS

| CN | 1162785 A | 10/1997 |
| CN | 1564139 A | 1/2005 |
| GB | 2270781 A | 3/1994 |
| WO | 02082278 A1 | 10/2002 |

OTHER PUBLICATIONS

Wu, Youfeng; et al "Compiler Managed Micro-Cache Bypassing for High Performance Epic Processors" Microarchitecture, 2002. (Micro-35). Proceedings. 35th Annual IEEE/ACM International Symposium on Nov. 18-22, 2002, pp. 134-145.
Chi, C-H; et al "Unified Management of Registers and Cache Using Liveness and Cache Bypass" ACM SIGPLAN Notices, ACM, Association for Computing Machinery, New York, vol. 24, No. 7, Jun. 21, 1989, pp. 344-355.
Hewlett-Packard Company; et al "Method for Improving Read Performance of a Database Bypassing Reads and Writes of a Database's Cache System" Research Disclosure, Mason Publications, Hampshire, GB, vol. 485, No. 36, Sep. 2004, pp. 1-2.

* cited by examiner

*Primary Examiner* — Kevin Verbrugge
*Assistant Examiner* — Eric S Cardwell

(57) ABSTRACT

A method and system for accessing memory using an auxiliary memory is presented. According to the invention store and following load instructions accessing same memory locations are identified and a temporal difference is determined. The store instructions comprise an indication for the time interval lapsing until a data element, which is stored by the store instructions, is loaded by a load operation for the first time. Based on this indication the store instruction is given access directly to the main memory or is routed to main memory through an auxiliary memory.

13 Claims, 3 Drawing Sheets

METHOD AND SYSTEM FOR ACCESSING MEMORY USING AN AUXILIARY MEMORY

The invention relates to a method and system for accessing memory, more particularly the invention relates to a method and system for accessing memory using an auxiliary memory. The invention further relates to a method for compiling a source program into a machine program.

Microprocessors play an important role in automization of day-to-day activities in modern lifestyle and the industry is making a continuous effort to make the automized processes faster.

Presently, microprocessors are available that can execute instructions at high speeds, subject to the availability of the data for the execution. For accessing the data for execution the processor has to communicate with the memory. This forms a bottleneck, as the improvement in memory speed has stayed behind the improvement in processor speed. The step of memory access normally results in stalling of the processor due to the speed mismatch.

Conventionally, processors are provided with a main memory and an auxiliary memory for a faster access of the memory. The auxiliary memory, which is often referred to as buffer or write back buffer, is used as an intermediate memory for temporarily storing data and address of the memory location in the main memory, where the data has to be stored. This allows the processor to quickly write the data, even when the main memory is being accessed by other instructions of the same processor or is being accessed by another processor or is subject to a refresh action.

The processor accesses the memory using load or store instructions. Conventionally each store instruction routes the data to main memory through the auxiliary memory, and each load instruction involves a search for the memory address in the auxiliary memory. If the address is located in the auxiliary memory then the data is fetched from the auxiliary memory. Otherwise, the data is fetched from the main memory at the specified address.

This technique allows prioritizing of the execution of load instructions over the store instructions by temporarily storing the data and address in the auxiliary memory. This permits the processor to load data from auxiliary memory before it has reached at its location in main memory. In addition, it allows the processor to load data from the main memory while other data is still awaiting to be stored in the main memory; nevertheless, this convention essentially requires each load instruction to search for the addresses in the auxiliary memory before it can access the main memory, which requires additional time. On the other hand, in case of portions in a machine program comprising multiple consecutive store operations, the store operation/s may assume priority over load operation/s in order to avoid data loss due to the size constraint of the auxiliary memory. This may result in additional stalling of the processor.

Therefore, it is an object of the invention to provide a method and system for accessing memory that reduces the number of stall cycles of the processor.

This object is achieved by providing a compiling method comprising the steps of:

identifying a store instruction; identifying a memory location accessed by said store instruction; identifying the first load instruction followed by the store instruction accessing the same memory location, hereinafter also denoted as the first associated load instruction of the store instruction, or first associated load instruction; providing the store operation with an indication indicative for a number of clock cycles between said load and store instructions.

The invention further provides a method for accessing memory comprising the steps of:

reading a machine program; identifying a first and a second type of store instructions based on the indication provided by said compiler, and; selectively routing data identified by said first type of store instruction to a main memory through an auxiliary memory and routing data identified by said second type of store instructions directly to main memory. Further the invention provides a system for accessing memory, comprising; a processor for executing store instructions; a main and an auxiliary memory for storing data addressed by store instructions; characterized in that, the processor is arranged for executing a first and a second type of store instructions wherein data identified by said first type of store instruction is routed to a main memory through an auxiliary memory and data identified by said second type of store instructions is routed directly to main memory.

This method and system enables a different way of data storage depending on the time lapsing from the moment a store instruction is executed for storing data at a given memory location until the moment data is loaded from said memory location.

This technique offers a mechanism to prioritize store instructions utilizing information regarding the time lapsing, also denoted as lapse time, between the store instructions and their first associated load instructions.

First and second type of store instruction may have two distinct types of opcodes. Alternatively both types of instructions may have the same opcode, but have an operand, which determine whether the instruction is carried out as a first or as a second type of store instruction. The operand may be binary, but may alternatively be a number in a range greater than two, e.g. the operand may represent a number of instructions between the store instruction and the first associated load instruction or the operand may also represent a number of clock cycles between said store and load instruction. In both cases a store instruction will be carried out as a second type of instruction if the operand identifies a number that is less than a predetermined threshold.

This method and system enables identification of store operations according to the expected lapse time and accordingly routes data directly to main memory only if the opcode or operand of the store instruction indicates that the data to be stored is required within a predetermined time. Effectively, according to this method and system, store instructions are identified and given priority to access main memory directly. Furthermore, this method and the system also ensure that the data reaches to the main memory from auxiliary memory before the processor requires the data. This assurance that any data required by the processor will be available in the main memory obviates the requirement of searching auxiliary memory when executing load instructions, resulting in faster executing of load instruction. Upon a load instruction desired data can be fetched from main memory straightforwardly.

The present invention is particularly favorable to be used in a multiprocessor system that comprises; one or more further processors each having a second auxiliary memory, coupled to said main memory and an arbitrator for arbitrating access of the main memory between the processors.

Above and other aspects of the invention will be apparent from and elucidated with reference to the embodiments described hereinafter as illustrated by the following figures.

The order in the described embodiments of the methods and systems of the current invention is not mandatory, and is illustrative only. The scope of the invention is not limited to the described embodiments. A person skilled in the art may change the order of steps or perform steps concurrently using threading models, multi-processor systems or multiple processes without departing from the concept as intended by the current invention. Any such embodiment will fall under the scope of the invention and is a subject matter of protection.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the system claims enumerating several means, several of these means can be embodied by one and the same item of computer readable software or hardware. The mere fact that certain measures are recited in mutually different dependent claims does not indicate that a combination of these measures cannot be used to advantage.

Figure 1:
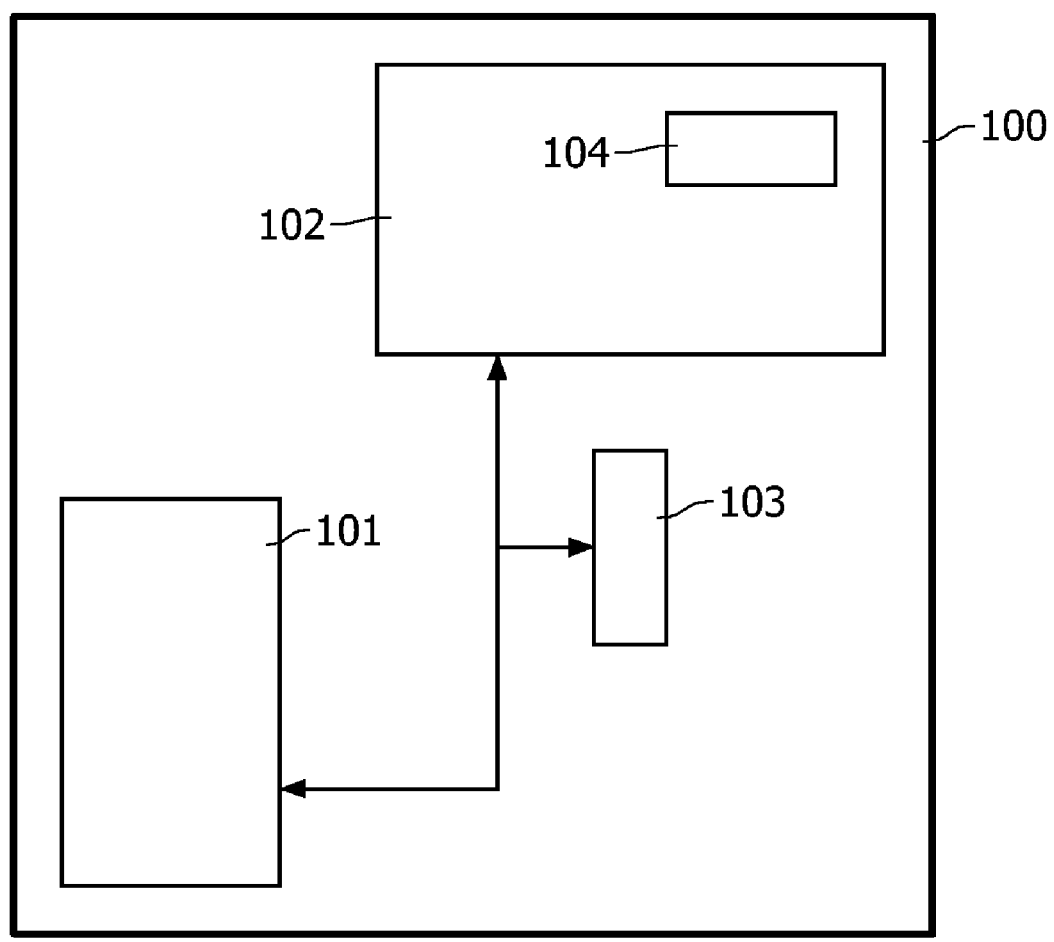
FIG. 1 illustrates a processor architecture suitable for carrying out the present invention.

Now referring to FIG. 1, which illustrates processor architecture 100, comprising a processor 102 connected to a main memory 101 and an auxiliary memory 103. A compiler 104 compiles a source code into a machine code. The compiler program 104 may be carried out by the processor 102, or by an external processor. For illustration the FIG. 1 shows a compiler within the processor 102 to indicate that it is executed by the processor. In that case the processor 102 will receive a source code and have it compiled by the compiler 104 for compilation. However when the compiler 104 is carried out by another processor than the processor receives the compiled machine code. While compiling the source code the compiler 104 identifies store instruction and determines the memory location accessed by said instruction. Further the compiler 104 determines a load instruction followed by the store instruction that accesses the same memory location and computes the number of clock cycles between the store and load instructions. The compiler 104 then provides an indication to the store instruction indicative of the number of clock cycles which lapses until the memory location accessed by the store instruction is again accessed by a load instruction. The indication may be an exact indication e.g. the precise number of clock cycles or the precise number of instructions. Alternatively, it may also be a relative indication e.g. less than or more than 20 clock cycles or instructions. On completion of the compilation the processor 102 executes each instruction of the code. While executing a store instruction the processor 102 checks for the indication provided to the store instruction. If the indication of the store instruction indicates that the lapse time is relatively large, i.e. said store instruction may be handled with a relatively low priority, than the processor 102 routes the data and address associated with that store instruction to the auxiliary memory 103. In addition the processor may store said address and data in the auxiliary memory along with an index, indexing maximum number of clock cycle that data may be stored in the auxiliary memory 103 before routing it to main memory 101, effectively defining a life time of data in the auxiliary memory 103. Alternatively all data in the auxiliary memory may have a fixed lifetime. In the latter case an index for indicating the lifetime is superfluous. The said index may be computed from said indicative or may be the same as the indicative itself, also in case of binary indicatives any data present in the auxiliary memory 103 may have a predetermined life time and there may be no need to route the index to the auxiliary memory 103. Subsequently, the auxiliary memory 103 routes the data to main memory 101 anytime when the main memory 101 is available to access but, not later than the maximum life time of data in the auxiliary memory 103. The processor 102 may be programmed to include any criterion to define a first or a second type of store instruction.

In other words the invention may be understood as follows. According to the invention store instructions are introduced in the instruction set of the processor 102 having an indicator, i.e. in the form of an opcode or an operand, which specifies the latency with which the store instruction may be executed. The indicator assigned by the compiler depends on the time elapsing between the moment a memory location is accessed by a store instruction, and the moment it is first accessed by a load instruction.

For example in a source code there may exist store instructions with a short latency (say, 2 clock cycles) and there also may exist a store instruction with long latency (say, 30 clock cycles). The compiler 104, while compiling the source code into machine code, determines the latencies of store instructions and provides an indication to each store instruction indicative of the type of the store instruction. The compiler 104 makes this decision based on the dependencies between load and store operations derived from the input source code. In this example, the store instruction with latency 2 clock cycles may be identified as short latency instruction and the store instructions with latency 30 clock cycles may be identified as long latency store instructions. After the compiler has generated a schedule, it can replace store operations with a short latency with store operations with a long latency, if it concludes from the dependencies that the same memory address is not accessed within 30 clock cycles. While executing instructions the processor 102, for long latency store instructions writes the address as well as the data in the auxiliary memory 103. If the indicator assigned to the store instruction not only specifies whether the allowed latency is 'short' or 'long' in addition a value may be stored which is indicative for a number of clock cycles until the data has to be forwarded to the main memory.

Figure 2:
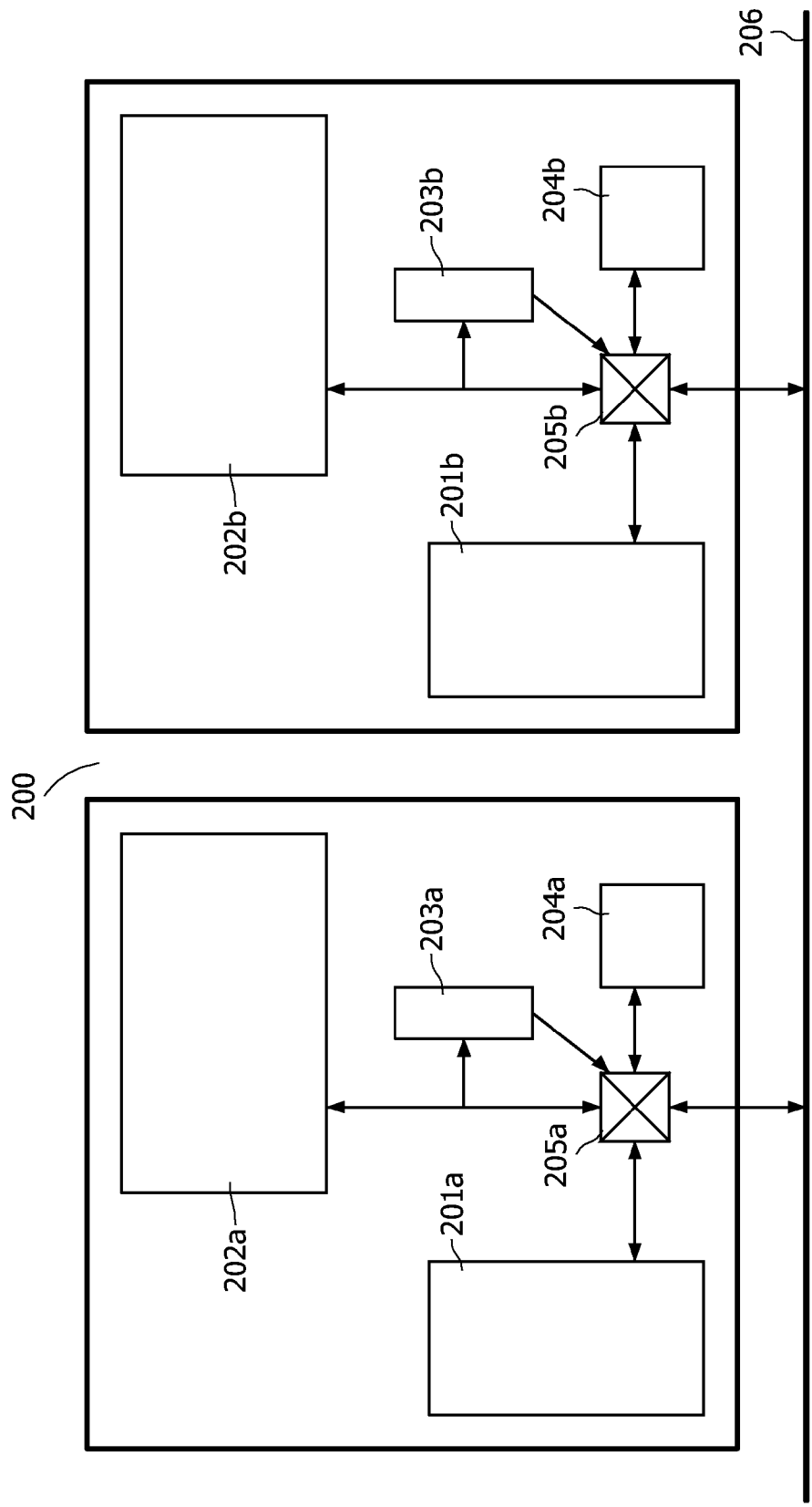
FIG. 2 illustrates a multiprocessor architecture suitable for carrying out the present invention.

Further reference is made to FIG. 2 illustrating a multiprocessor architecture 200 in which the invention may be exercised. Such architecture has a main memory 201a, 201b that is shared by multiple processors 202a, 202b through a bus 206, etc. Each processor 202a, 202b, etc. has an auxiliary memory 203a, 203b etc. To arbitrate the access of main memory 201a, 201b an arbitrator 204a, 204b is provided. The arbitrator 204 guarantees that each processor 202a, 202b, etc. can access the shared memory 201 within a predefined amount of time such that the execution time of a task is bounded. A switch 205a, 205b may be provided for enabling data and control routing on the data bus. The execution time of tasks may be bounded, for example, by a typical requirement of real-time systems for which a minimum throughput or a maximum latency of the application must be guaranteed. One of the possible examples for predefined memory access time may be obtained by applying the Time Division Multiple Access (TDMA) arbitration policy or any other time division policies best suited for particular application.

Figure 3:
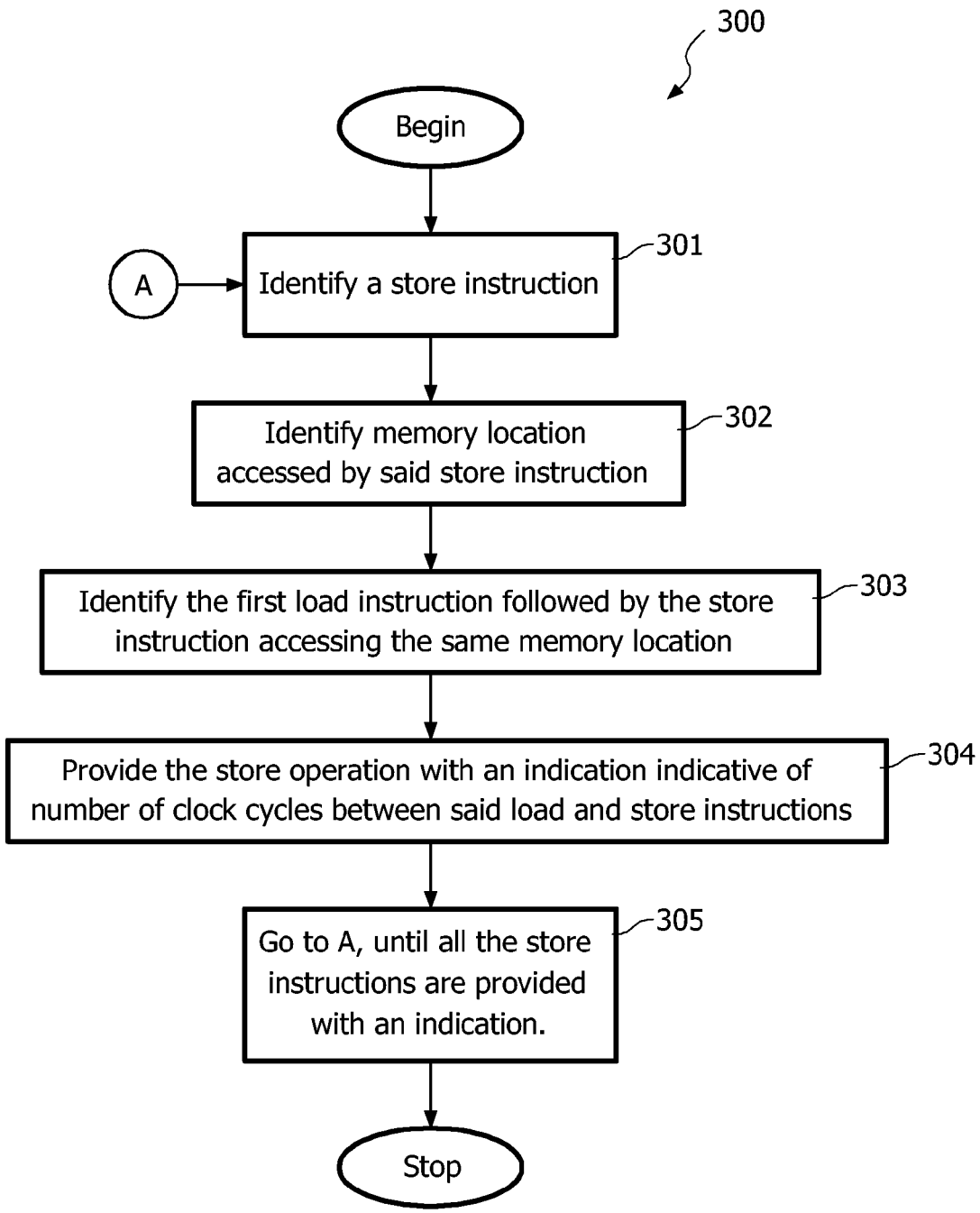
FIG. 3 illustrates steps followed in compilation.

Reference is now made to FIG. 3, which illustrates steps followed in compilation 300. According to this illustration in the first and second steps 301, 302 a store instruction and memory location access by said store instruction is identified. Then a first load instruction accessing the same memory location is identified in step 303. In next step 304 an indication indicative for a number of clock cycles between said load and store instructions is provided to said store instruction. The control in step 305 is then transferred to "A" for repeating steps 301 to 304 until all the store instructions are identified and provided with said indication.

When there is a single flow of instructions (without any conditions), the compiler may provide the indications to the store instructions by identifying store and load instruction accessing same memory location and by determining temporal separation between the said instructions.

However for the situation wherein the flow of instruction splits into one or more branches, (conditional instructions flow) each branch may have different temporal intervals between. In that case the store instruction issued before flow split and load instructions issued in the spitted branches of the instruction flow, notably all the load instructions accessing same memory locations as the store instruction, the compiler may determine the shortest temporal difference between said store instruction and the earliest of said load instructions and accordingly assign an indicative to said store instruction.

Above discussed methods and system are illustrative only and a person skilled in the art will appreciate that the invention is also applicable to a system where the main memory forms part of a memory hierarchy, e.g. having in addition to the main memory one or more caches. In that case data to be stored in the main memory may be handled according to various cache policies, well known as such, e.g. write through, write back, write allocate, and no write allocate. In an embodiment of the invention the cache memory may function as an auxiliary memory. A person skilled in the art will also appreciate that mere changing the order of the steps or mere arrangement/rearrangement of blocks may result in similar results as described above, any such variation or rearrangement will fall under the scope of the invention.

The invention claimed is:

1. A method for compiling a source program into a machine program, the method comprising:
   identifying a store instruction;
   identifying a memory location accessed by the identified store instruction;
   identifying a load instruction accessing the identified memory location;
   computing a number of clock cycles between the identified store instruction and the identified load instruction;
   providing the identified store instruction with an indication of the computed number of clock cycles between the identified load instruction and the identified store instruction.

2. The method of claim 1, further comprising:
   providing, as the indication, a precise number of clock cycles between the identified load instruction and the identified store instruction.

3. The method of claim 1, further comprising:
   providing, as the indication, a relative number of clock cycles between the identified load instruction and the identified store instruction.

4. The method of claim 1, further comprising:
   storing a maximum number of clock cycles that data may be stored in an auxiliary memory.

5. The method of claim 1, further comprising:
   defining a fixed lifetime for all data stored in an auxiliary memory.

6. The method of claim 1, further comprising:
   providing, as the indication, a type of the identified store instruction.

7. The method of claim 6, further comprising:
   classifying types of identified store instructions as either short latency store instructions or long latency store instructions.

8. The method of claim 7, further comprising:
   replacing the short latency store instructions with the long latency store instructions.

9. The method of claim 7, further comprising:
   writing both an address and data into an auxiliary memory for the identified store instructions classified as the long latency store instructions.

10. The method of claim 1, further comprising:
    storing a value indicative of a number of cycles for storing data in an auxiliary memory before forwarding the data to a main memory.

11. A method for accessing memory comprising:
    compiling, with a compiler, source code into machine code;
    providing, with the compiler, an indicator of priority levels of store instructions in said machine code;
    executing the store instructions with a processor while checking for the provided indicator;
    selectively routing data corresponding to the store instructions, with the processor, either to a main memory through an auxiliary memory or directly to the main memory based upon the checked indicator.

12. A system for accessing memory, comprising:
    a compiler configured to provide an indicator of priority levels of store instructions in machine code which compiles source code into the machine code;
    a first processor configured to execute the store instructions in the machine code while checking for the provided indicator, wherein the first processor is configured to selectively route data corresponding to the store instructions either to a main memory through a first auxiliary memory or directly to the main memory based upon the checked indicator.

13. The system for accessing memory as claimed in claim 12, wherein said system further comprises:
    a second processor having a second auxiliary memory that is coupled to said main memory; and
    an arbitrator configured to arbitrate access of the main memory between the first processor and the second processor.

* * * * *